CODE TRANSMISSION SYSTEM FOR MESSAGES OF UNLIMITED LENGTH

Filed June 28, 1966 4 Sheets-Sheet 1

INVENTORS
William H. Moore and
Vito J. Alioto.
BY W. L. Stout
THEIR ATTORNEY

CODE TRANSMISSION SYSTEM FOR MESSAGES OF UNLIMITED LENGTH

Filed June 28, 1966 4 Sheets-Sheet 4

United States Patent Office 3,509,277
Patented Apr. 28, 1970

3,509,277
CODE TRANSMISSION SYSTEM FOR MESSAGES OF UNLIMITED LENGTH

William H. Moore and Vito J. Alioto, Pittsburgh, Pa., assignors to Westinghouse Air Brake Company, Swissvale, Pa., a corporation of Pennsylvania
Filed June 28, 1966, Ser. No. 561,231
Int. Cl. G08b *29/100;* H04l *7/00*
U.S. Cl. 178—69.5 5 Claims

ABSTRACT OF THE DISCLOSURE

This invention relates to a code transmission system in which a message is sent from an office time base code generator over a communication link to a remote station time based receiver. The code generated is synchronized upon reception at the remote station with the time based receiver by the format of the code. The code format carries continuous message information. This continuous message in code form also simultaneously contains an inherent characteristic which maintains the remote station time based receiver synchronized with the office time based code generator whereby the message length is not limited by the need to periodically interrupt the message to bring about synchronization between the office and the remote station.

This invention relates to a code transmission system which allows the transmission of messages of unlimited length.

More specifically, this invention relates to a code transmission system in which a message is sent from an office time based code generator over a communication link to a remote station time based receiver. The code generated is synchronized upon reception at the remote station with the time based receiver by the format of the code. The code format carries continuous message information. This continuous message in code form also simultaneously contains an inherent characteristic which maintains the remote station time based receiver synchronized with the office time based code generator whereby the message length is not limited by the need to periodically interrupt the message to bring about synchronization between the office and the remote station.

It has been well recognized that all time based codes require synchronization in the transmission and reception of information between one location and another. This problem has been solved in the past by the design of sophisticated and expensive clocks, one of which is located at a central office and one at each of the remote locations sought to be controlled. Today's systems are growing at an explosive rate with regard to the number of locations sought to be controlled and the amount of information to be transmitted. This is especially true in such varied areas of technology as pipelines which span an entire country and rapid transit systems that are headed for full automation. The sophisticated and expensive clocks already noted have an inherent drawback in that extremely long messages may ultimately fall out of synchronization and some message information will be lost. To prevent this from happening and to provide maximum safety, the prior art code systems would periodically interrupt the message to allow a clock resynchronization function to occur. The invention to be described here solves all the problems just noted in that the clocks of the system to be described may be conventional low-cost clocks of only modest accuracy. In addition, the message length is unlimited and a message need never be interrupted to resynchronize the clocks. All of these advantages are provided with stunning simplicity and therefore greatly advance the code transmission art.

It is therefore an object of this invention to provide a code transmission system that allows automatic resynchronization of a receiving station and a control office without having to interrupt the message to accomplish this end.

It is another object of this invention to provide a code transmission system that allows the faithful transmission and reception of messages of unlimited length.

Still another object of this invention is to provide a code transmission system that may utilize inexpensive conventional clocks of only modest accuracy and still maintain system synchronization during the transmission of message of unlimited length.

In the attainment of the foregoing objects there is provided a digital binary code transmission system which allows the transmission of message of unlimited length over a communication link between an office and a remote station. Located at the office there is a master clock which provides the time base for a predetermined code generated by a code generator at the office. The code generated is always changing from at least one state to at least one other state at preselected intervals.

In the preferred embodiment the code takes the format of being a mark or a space. The code message is transmitted in such a manner that every true bit of message information whether a mark or a space is always followed by its complement, a space or a mark, respectively. The remote station has a detecting unit and a clock controlled by said code detecting unit. The clock drives a binary counter, which binary counter in turn controls a shift register, which shift register is fed the code detected by the code detecting unit. The final component of the system is a binary counter reset device, which device is controlled by the code detected by the code detecting unit. The binary counter reset device produces a reset pulse which resets the binary counter whenever the code changes from a mark to a space and from a space to a mark.

In one embodiment the binary counter reset pulse is produced only when there is a change from a mark to a space. In another embodiment the reset pulse is produced only when there is a change from a space to a mark.

Other objects and advantages of the present invention will become apparent from the ensuing description of illustrative embodiments thereof, in the course of which reference is had to the acompanying drawings in which:

FIG. 1 illustrates several code pattern formats in binary form.

FIG. 1*a* depicts the manner in which the various sheets of drawings are to be assembled to set forth a complete illustration of the invention.

FIGS. 2, 2*a* and 2*b*, taken together in the manner depicted in FIG. 1*a*, illustrate in block diagram form a preferred embodiment of the invention.

Figure 2:
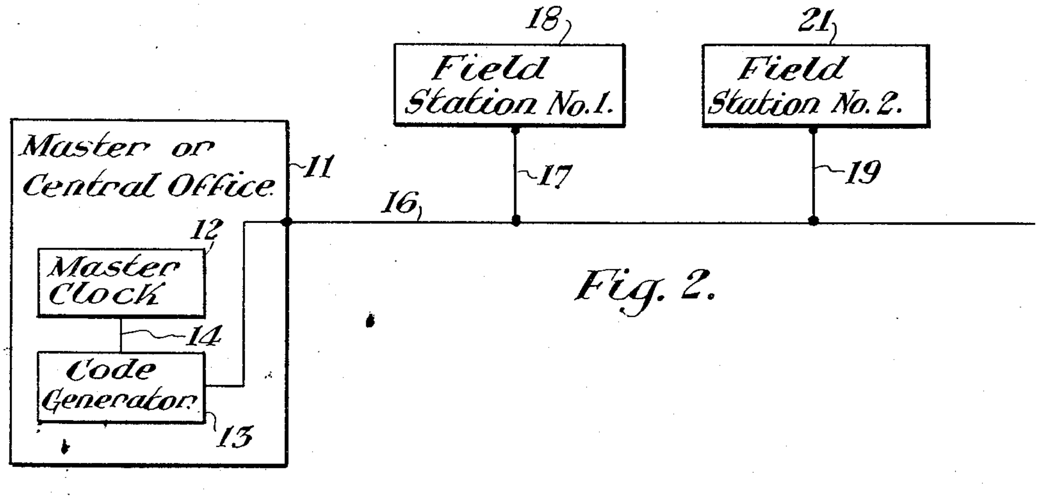

A description of the above embodiments will follow and then the novel features of the invention will be presented in the appended claims.

This code transmission system is comprised of a master station and a number of remote stations. Accessory equipment such as a control console and/or computer may be included in certain applications.

The master station is the heart of the system and transmits messages to each remote station asking for the status of various elements at the remote stations. The master station also transmits commands to the remote stations instructing the remote stations to perform specific operations at the field location. The master station is designed to operate with either a self-contained relay or computer-storage technique. The nature of commands to be sent out and the time they are sent can be controlled manually from an operator's console or panel, automatically by means of programming equipment, or by a combination of these methods. Also, computer equipment can be used to increase the degree of automation when required.

The remote stations are unmanned. They receive instructions from the master station and automatically gather indication information and transmit the information back to the master station. Typical information transmitted by the remote stations is the status of circuit breakers in an electrical power distribution substation, the status of valves in a pipeline, or the position of railway track switches and wayside signals, etc. Information in the form of numerical data can be transmitted from the remote stations to the master station where the data can be displayed and stored on digital readout indicators printed out for permanent record or entered into computer equipment.

The code system that will be described can be operated from 60 cycle, 115 volt single phase power. All direct current voltages required for operating the master and remote stations are then developed in conventional alternating current to direct current power supplies. The system to be described is capable of operating at a number of distinctive rates which may vary from 25 bits per second or less to well in excess of 400 bits per second. The choice of bit rate selected for a particular installation is influenced by the communication data link available at the geographical area to be encompassed by the code system network. For example, telegraph type line circuits are employed for bit rates up to 50 bits per second. For operation at speeds faster than 50 bits per second, frequency modulated carrier or frequency shifted tone equipment is needed.

This invention will be described in its most elemental form, where, for example, 50 bits per second are being transmitted. It is to be recognized, of course, that the number of bits per second can exceed the 400 bit per second, and it is the intent of this invention to encompass a virtually unlimited number of bits per second within the purview of the invention to be described.

Reference is now made to the code format. Specifically, with reference to FIG. 1, there is depicted a code pattern message format which may be utilized in carrying out the invention to be hereafter described. In this instance there is an exemplary message which takes the following form: 1111100000. In this FIG. 1 and the first code depicted, a true bit is a logical 1, and it will be appreciated that each of these 1's in its coded message is shown depicted graphically as a code pattern of 1's then followed by 0's. This message code format also includes a message complement. In this instance the message complement is exactly the opposite of that which was transmitted as the true bit information. Therefore, the message complement portion depicted to the right of this first prior art message is a series of 0's followed by a series of logical 1's which make up the message complement.

Figures 1, 1A:
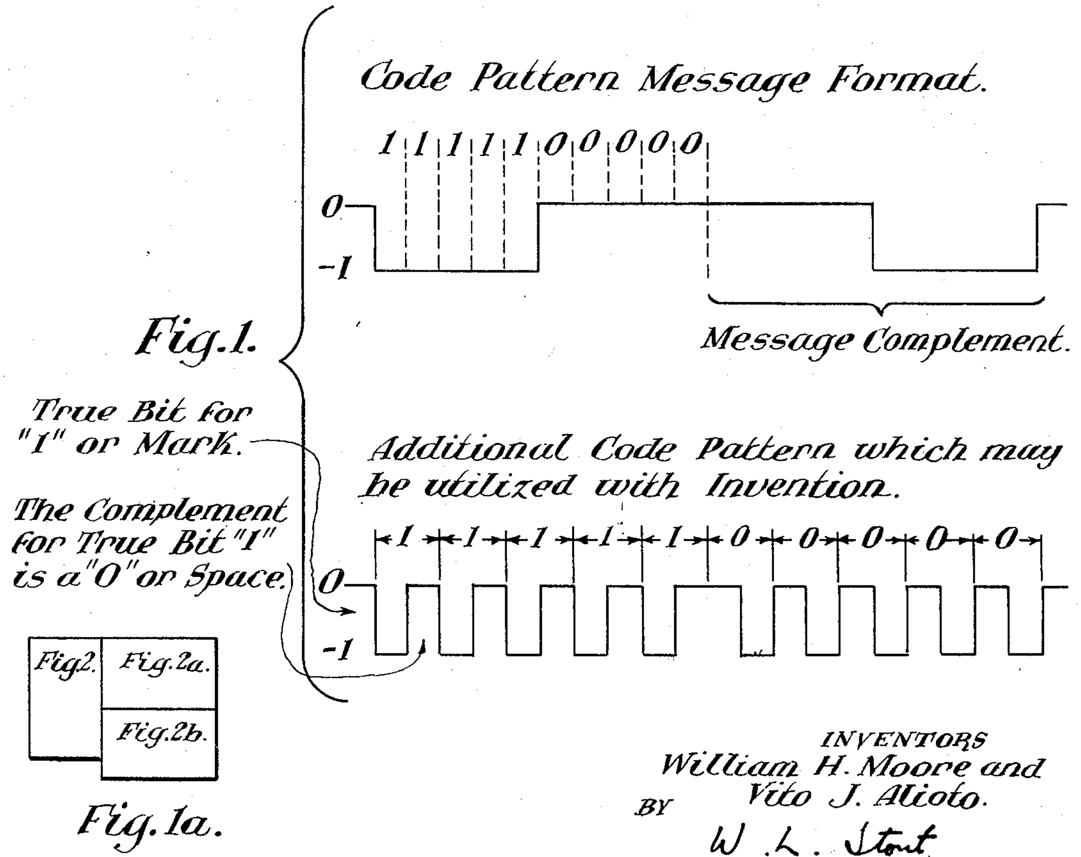

The code next depicted in FIG. 1 forms in part the subject matter of a separate copending application of William H. Moore titled "Method of Transmitting Binary Code Messages With Minimum Resynchronization Time" filed June 28, 1966, Ser. No. 561,135. Accordingly, it is to be understood that the inclusion of this code format is present herewith only to aid in the description of a preferred embodiment of the invention. This particular code format provides a unique characteristic which will be utilized by the system to be described hereafter. This type of format permits the transmission of messages of unlimited lengths and is the subject of the copending application just noted. The code format, for example, has a true bit designated as a logical 1, and its complement designated as a logical 0. In accordance with standard code system terminology, a logical 1 will be called a "mark." And as can be seen, for every true bit of information it will always, according to the code pattern, immediately be followed by its complement. In the illustration depicted the code message is the same as that which was selected for the first code message, and it will be appreciated that wherever a true mark bit, which is to designate a 1, is transmitted it is followed by a "space" which is its complement and this is of course a 0. Following the same standard, logical 0's will be called "spaces" when referring to signals in the communication portion of the system. A logical 0 will be designated a 0 volt signal when referring to voltage measurements within the logic circuitry.

In order to appreciate and gain an understanding of the invention to be described hereafter it need only be recognized that the code will of necessity periodically change states between marks and spaces and spaces and marks for the code format requires that every true bit of information transmitted it be followed by its complement. This of course requires a change in state. It can be appreciated that if the code pattern format of the prior art sent a message which comprised many, many 0's, more than actually is shown, as part of the message, there would not be a change in state in the code for a longer period of time. If this message, for example, had many hundreds of 0's, one after the other, the code according to the prior art would transmit a series of spaces for a long period of time. This would create a problem of loss of synchronization of the field clocks with the master clock which would be located at a master or central office. It will be appreciated that since the codes are time based, in order for the information to be utilized in the field, there will have to be a synchronization of the receiving equipment in the field with the master or central office that is originating the code. The problem of fast clocks and slow clocks will be explained more fully hereafter and their deleterious effect on the transmitted code message will be appreciated more fully with a study to be made of the latter figures.

As has been noted, this invention concerns itself with the technique of extending the allowable length of a message on a message synchronized code system. In former prior art code systems the receiver clock would start on receipt of a new message and would rely on crystal accuracy to keep itself synchronized through the entire message. It has been found that there was typically a limit of approximately 400 bits to the message length. Of course this might have been extended by the incorporation of extremely sophisticated and expensive crystal clocks whose accuracy would be greater than the 400 bit message length just noted. The technique involved in this invention is most useful for a complement checking type of code but would also work as well for an odd parity type or any other format as long as the message changes from a logical 1 to 0, or from 0 to a logical 1 at predictable intervals.

The use of this invention also permits the utilization of inexpensive clocks such as multivibrators of only modest accuracy. This will be better appreciated as a study of the invention goes forward at this time.

Reference is now made to FIG. 1*a* which depicts the manner in which the sheets of drawings presented herewith must be arranged in order that the entire system be depicted. With FIGS. 2, 2*a* and 2*b* positioned in the manner shown in FIG. 1*a*, the following system description is in order. Shown in FIG. 2 is a master or central office 11. Within the master or central office 11 there is depicted in schematic form a master clock 12 electrically connected via lead 14 to a code generator 13, which code generator 13 is in turn connected via a communication link 16, here depicted as an electrical lead, to a number of field stations 1, 2 and N, designated respectively by reference numerals 18, 21 and 22, and electrically connected to the communication link 16 respectively by the leads 17 and 19. The field station N is connected directly by the communication link 16. The master or central office 11 is shown here in schematic form. It will be appreciated that the sending equipment located in the master or central station 11 is of a conventional type as, for example, the type depicted in the code system described in some detail in the article titled "Solid State Devices," which was published in the Railway Signaling and Communication Journal, April 1963, on pages 13 through 22. The specific sending equipment is shown in FIG. 17 of this article. The only requirement of the master or central office is the fact that it produce a code pattern which changes state predictably. Typical codes which would accomplish this end are the codes described in FIG. 1. Keeping in mind that there appears upon the communication link 16, a code pattern of the type set forth in FIG. 1 or one which changes state at predictable intervals, the operation of the remaining portion of the system will now be made.

The message with the code format just noted is delivered to a message detector 23 in the field station 22 (N). The message is detected by the message detector 23. A detailed description of this type of message detector may be found in the article just noted relating to "Solid State Devices." FIG. 18 of that article shows a message detector which would fill the needs of this system and the invention. Since it is conventional no detailed explanation will be made of the message detector, only that the message detector 23 will deliver on the output leads 26 and 27 a mark pulse on lead 26 or a space pulse on lead 27, and these will take the form of square wave pulses as depicted in this figure. It also should be kept in mind that if the clock is not already running, whenever a space is detected by the message detector 23, there will also appear a control pulse on the electrical lead 24 which emanates from the message detector 23. This pulse on the lead 24 will cause a field clock 32 to start generating a square wave pulse chain, in this instance arbitrarily selected at X pulses per second and this continuous pulse chain will be delivered to a binary counter 52. The details of this binary counter 52 may be seen in FIG. 14 of the article referred to herebefore, and the precise details of the binary counter are not essential to any extent greater than that which is shown in the schematic representation presented within the binary counter 52. The field clock delivers its pulses via the electrical lead 51 to a first flip-flop 55, and this series of flip-flops 55, 56, 57, 58 and 59 provide a frequency dividing action which will be appreciated as the description ensues.

Figure 2B:
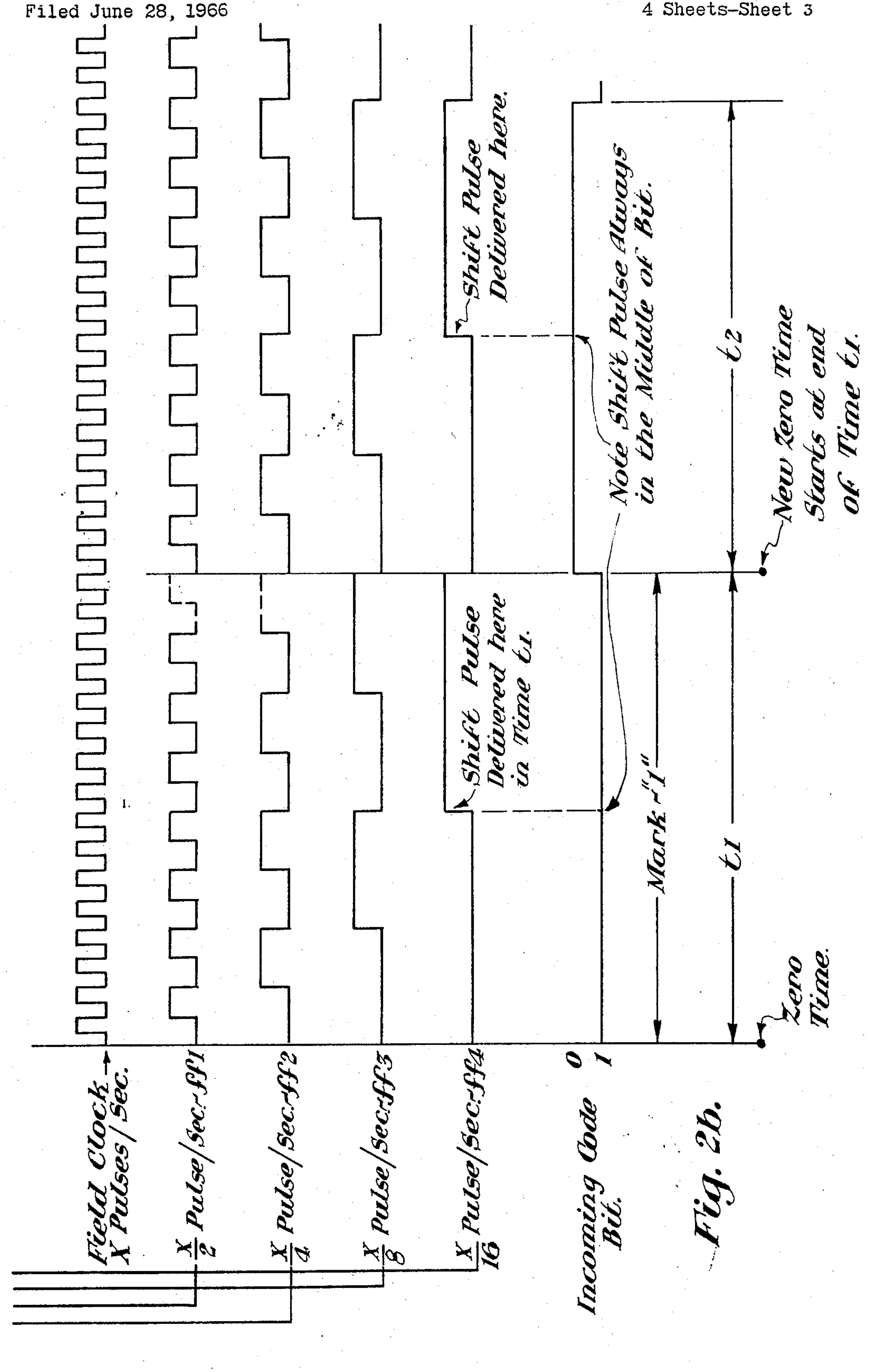

For purposes of explaining the invention each of the flip-flops 55, 56, 57, 58 and 59 has shown emanating therefrom respectively leads 66, 67, 68 and 69, which pass downwardly and away from the binary counter to FIG. 2*b* in which these leads are shown being delivered to a graphic representation of the frequency pattern of the square wave signals that are being generated at each of the flip-flops 55, 56, 57, 58 and 59. It will be appreciated that each of the flip-flops just noted is connected respectively by electrical leads 61, 62, 63 and 64 with a flip-flop 59, the final flip-flop in the series, having an output 65 to a bit counter which is not shown and does not form a part of this invention. It will also be appreciated that the flip-flop 58, which is flip-flop No. 4 in the series of flip-flops, has an additional output designated by the reference numeral 70, and it is from this flip-flop No. 4 that a shift pulse is delivered to a shift register 31 electrically, which shift register is connected to the message detector 23 via the leads 26 and 27. The shift register 31 is of a conventional type and of the same kind depicted in FIG. 18 of the article noted earlier.

To each of the flip-flops depicted there is connected an electrical lead 44 which provides a reset function. This lead 44, which originates at a binary counter reset gate 33, is connected to flip-flop Nos. 1 and 2 via the electrical leads 46 and 47, via the electrical lead 48 to flip-flop No. 3, via the electrical lead 49 to flip-flop No. 4, and via the electrical lead 50 to flip-flop No. 5. The binary counter reset gate 33, shown here as a block, will be described in more detail hereafter with reference to FIGS. 3, 4 and 5 which depict several circuit variations which may be employed in carrying out the invention. The binary counter reset gate 33 is connected across the leads 26 and 37 by electrical leads 28 and 29. It will be appreciated that at each time a mark appears on the electrical lead 26, a square wave pulse will also appear on the electrical lead 28, and by the same token whenever a space signal appears on the electrical lead 27 a square wave pulse will also appear on the electrical lead 29 to the binary counter reset gate 33.

Going now specificaly to FIG. 2*b*, in FIG. 2*b* the graphical presentation set forth here, as has been noted, is placed at this point in the system to aid in the comprehension of the function that will be performed timewise with reference to the receipt of a message and the coordination and synchronization of the delivery of the coded message to the shift register 31. As it can be seen on the first line of the graphic illustration in FIG. 2*b*, there are represented the field clock pulses appearing at a pulse rate of X pulses per second. The first flip-flop, designated by reference numeral 55, would have an output which would be $X/2$ pulses per second and would take the form depicted in the graph on the second line thereof in FIG. 2*b*. If there were an output taken from the flip-flop 56, which is flip-flop No. 2, this would have an output which would be represented by $X/4$ pulses per second, and as will be appreciated the flip-flop No. 3 would have an output which would be $X/8$ pulses per second and would take the form depicted on the fourth line of this graph. The output which would appear on the electrical lead 70 from flip-flop No. 4 is depicted on the fifth line of the graph and this output would take the value of $X/16$ pulses pers second. Accordingly, $X/16$ pulses per second would be the time sequence of the shift pulse which would appear on the electrical lead 70. This shift pulse designated on line 5 is delivered for example during time *t*1. Directly beneath the fifth line of this graphic representation there is designated the line referred to as an "incoming code bit," in this instance a mark, which is a logical 1 at a minus voltage level. The problem that is faced by the shift register arises due to the fact that the shift register must receive or count the mark at some time during the duration of the incoming code bit, preferably in the middle of the time *t*1. If time is measured from zero at zero time on the left-hand portion of this graphic illustration, it will therefore be appreciated that if a mark should appear on the electrical lead 26 and present itself to the shift register 31 at exactly the middle of time *t*1, the shift pulses which appear on electrical lead 70 would permit the mark to enter the shift register and there be recorded for future use in a manner typical of code systems of this nature.

At this time the problem of synchronization might best be appreciated. Let us imagine that the shift pulse, which is designated by the graphic representation on the fifth line down from the field clock pulse rate, and which is shown delivered here in the midle of the time *t*1, should appear on either side of the time period *t*1, the mark bit would be missed by the shift register. This will be better appreciated when a study is made of FIG. 6 hereafter. At this time it need only be stated that the binary counter reset gate 33, which is connected via the electrical lead 28 to the electrical lead 26, is so designed that whenever a change in state occurs, namely, the appearance of a mark on electrical lead 26 and therefore electrical lead 28, the binary counter reset gate will provide an output over the electrical lead 44 and this will be designated a flip-flop reset pulse which would therefore cause all the flip-flops in the binary counter to go to a 0 or starting state, at which time they would begin their counting function once again in the manner described earlier. This counting function having been described as a frequency dividing action to provide a shift pulse at the appropriate time. In this instance the appearance of a mark on the electrical lead 26, as well as the electrical lead 28, would cause a flip-flop reset pulse to be generated by binary counter reset gate 33 which would then start the binary counter counting at a new designated time referred to here as "new zero time" which begins at the end of the time period *t1* designated at the bottom of the graphic illustration in FIG. 2*b*. It will be appreciated that if their counting function starts once again at new zero time, the shift pulse will be then delivered exactly in the middle of the next bit being delivered to the shift register 31. In other words, the shift pulse will be delivered, as has been shown by the legend, twice, once in the middle of the mark and again in the middle of the space, and this shift pulse will always be delivered in the middle of the bit because this invention in its broadest application would also provide for the flip-flop reset pulse to appear on the electrical lead 44 from the binary counter reset gate 33 whenever either a space pulse appeared on the lead 27, the lead 29, or when a mark pulse appeared on the lead 26 and the lead 28. The specific details of this binary counter reset gate 33 will now be described with reference to the illustration set forth in FIGS. 3, 4 and 5.

Figures 2A, 3, 4, 5:
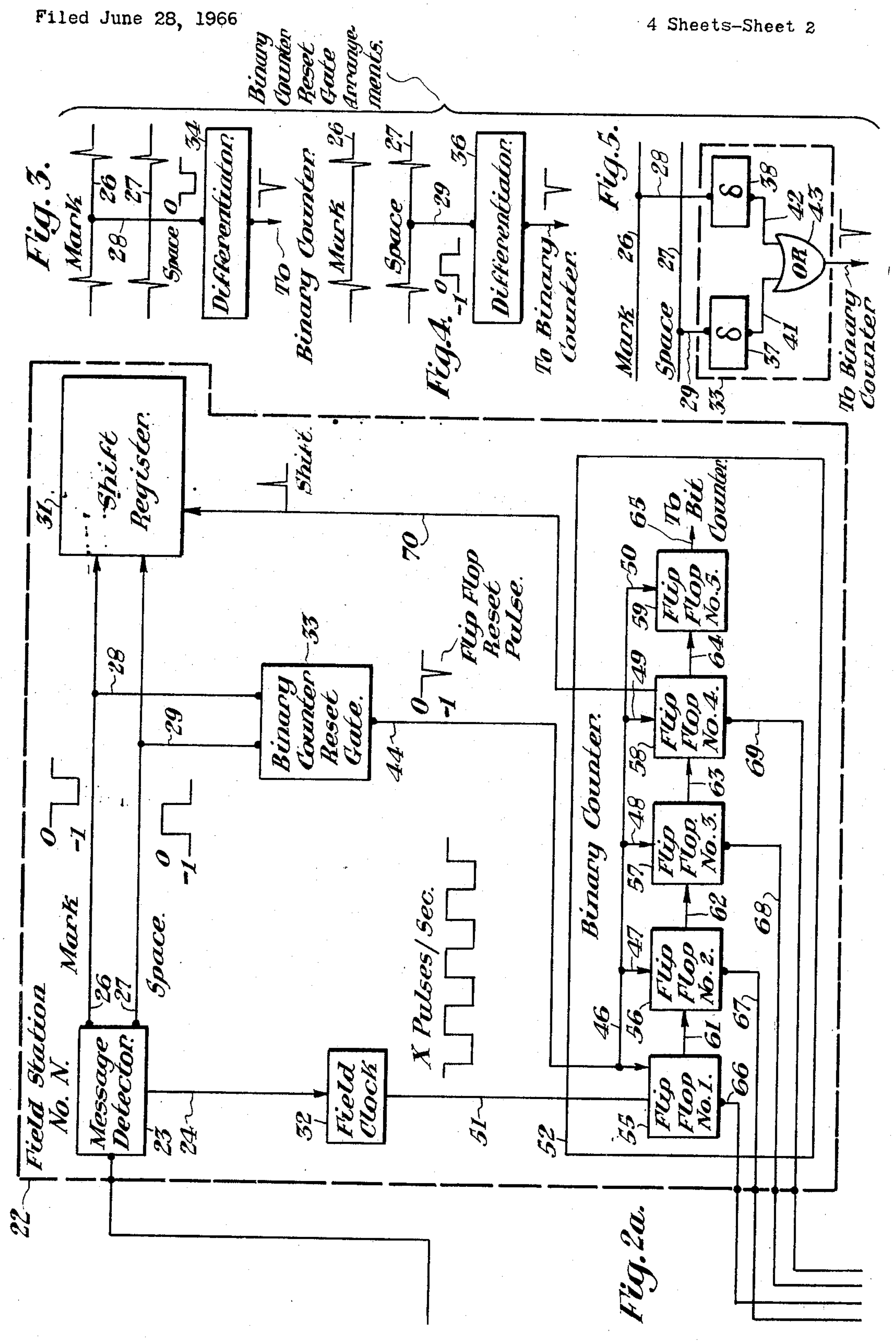
FIGS. 3, 4 and 5 illustrate several variations for the system's binary counter reset gate.

These FIGS. 3, 4 and 5 show several variations which embody the invention and may be utilized dependent upon the accuracy of the clocks involved. The first variation is that which is depicted in FIG. 3. In this situation the binary counter reset gate 33 would take the form of a differentiator 34 and there would not be the need for the electrical lead 29. For in this embodiment only the electrical lead 28, which is shown here connected electrically to the lead 26, is needed. The differentiator 34 is of a conventional nature; for example, the type depicted in Electronic Circuits by Thomas L. Martin, Electrical Engineering Series, 1955, pages 615 to 619. This differentiator functions in the following manner: When there is delivered a square wave pulse over the electrical lead 28 to the differentiator 34, there is then produced a peaked voltage output shown here being delivered as a reset pulse to the binary counter. It will therefore be understood that every time there is a change in state to a mark pulse there appears on the electrical lead 26 a binary counter reset pulse from the differentiator 34, and since there is no electrical connection to the lead 27 only when a mark pulse appeared in the code would there be a binary counter reset pulse delivered to the binary counter 52.

Reference is now made to FIG. 4 in which just the opposite situation is illustrated. By this it is meant that whenever a change in state to a space pulse would appear on the electrical lead 27 there would then appear on the electrical lead 29 secured to the lead 27 a square wave pulse which would be fed to the differentiator 36 and there would appear a binary counter reset pulse delivered to the binary counter 52. It is therefore readily evident that if this embodiment were employed, the only time a reset pulse would originate would occur when a shift to space pulse had been detected by the message detector described earlier. This reset pulse would then appear approximately at every other pulse. Of course this takes into account the fact that the code format as described earlier is always changing from one state to another state pursuant to the technique of providing a true bit and then its complementary bit immediately following.

Reference is now made to FIG. 5. In this environment the maximum effectiveness of the binary counter reset gate would be utilized because in this environment there has been depicted a pair of differentiators 37 and 38 secured electrically via leads 29 and 28, respectively, to leads 27 and 26, which carry the mark and the space pulses. Accordingly, the differentiators 37 and 38, which are of the same type depicted with reference to FIGS. 3 and 4, each would produce a pulse over its respective leads 41 and 42, which pulses would appear at the OR gate 43. The OR gate 43 is of a conventional nature and provides an output to the binary counter in the form of a reset pulse when there is either a pulse shift on lead 41 or a pulse shift on lead 42. It is therefore evident that every time there is a change from a mark to a space, or a space to a mark there appears a signal on leads 26 or 27 rspectively, there will also follow a binary counter reset pulse delivered to the binary counter 52 of FIG. 2*a*.

Up until to this point the nature of the problem which this invention solves and a discussion thereof has been neglected in order to present the overall system which will handle this problem. The problem can best be understood by a study which will now be made of FIG. 6 of this specification.

Figure 6:
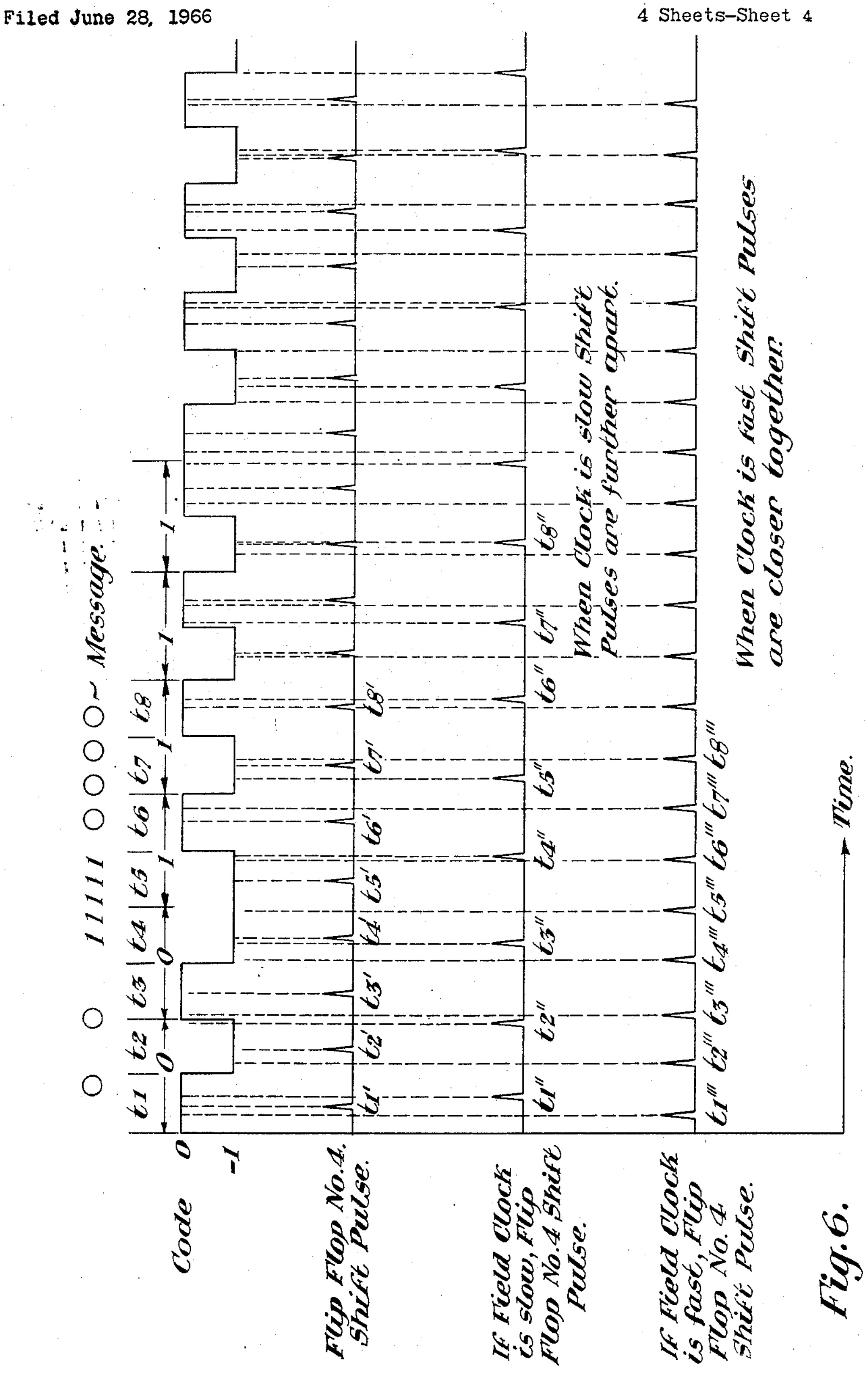
FIG. 6 is a graphic showing of the synchronization problem solved by the utilization of the invention.

At the top of FIG. 6 there is illustrated in the first line a code message which is comprised of, for this example, of a code having a fromat which follows the type of format as the code appearing on the second line of FIG. 1. For purposes of this graphic representation time is to be measured as having its start on the left-hand side of the figure and extends to the right. The code then would follow the pattern set forth on the second line where the legend indicates "Code." At the outset it should be noted that this figure presents in greatly exaggerated form the problem that is present and is intended in no way to accurately define the problem as it really exists but more nearly to aid in the comprehension of the problem and how the system described earlier copes with this type of problem and provides the capability of delivering a message of unlimited length.

Returning once again now to FIG. 6: during the time period *t1* there is a code pulse which is a 0. In time *t2* there appears the complement bit 1, time *t3* there appears true bit 0, time *t4* there appears complement bit 1. In time *t5* there is a logical 1 and in *t6* its complement which is a 0 or a space. Now going to the third line in which the legend indicates the flip-flop No. 4 produces a shift pulse, if the field clock 32 of FIG. 2*a* were in perfect synchronization with the master clock 12 at the central office 11, ideally there would be produced a shift pulse on the electrical lead 70 to the shift register 31 at exactly in the middle of time periods *t1*, *t2*, *t3*, *t4*, etc. Here the flip-flop No. 4 shift pulses have been designated as *t1'*, *t2'*, *t3'* and *t4'*, etc. It can be seen that each of these shift pulses would then appear in the middle of the bit and accordingly there would be an acceptance of this bit by the shift register 31. At no time if these clocks were perfect would there ever be a bit missed.

Now the problem will be described when the clock rate is slow due to environment or the inherent nature of the clocks. This situation is depicted in the fourth line where the legend designates that the clock pulse is slow. When the clock is slow this means that the clock pulses are further apart. Now the clock pulses on the fourth line of this graphic representation are designated as appearing at times *t1''*, *t2''*, and onto *t8''*. It can be seen that if the clock were slow, a shift clock pulse would appear during the time period *t1* of the code and the 0 bit information would be accepted by the shift register 31. At time *t2''* the shift pulse would just fall in the time period *t2* and the second 1 bit would be safely accepted by the shift register 31. Now at time *t3''*, it will be seen that the entire 0 bit that appeared during the time *t3* of the code is missed for if the shift pulse of *t3''* is traced it will be seen to fall within the time *t4* and then the appearance of this shift pulse at *t3''* would permit the shift register 31 to accept the 1 bit during the time period *t4*. What has happened is the 0 bit of information in time *t3* has been skipped. This is an intolerable situation. This graphic illustration which need not be carried further with reference to a slow clock shows that unless there is some means to synchronize the shift pulses, there is a chance that a bit will be missed completely in the event that the clock is slow.

The second situation depicted, illustrates the problem where the field clock is fast. It will be appreciated that the last line of this graphic illustration shows the shift pulses from the flip-flop No. 4 closer together as when a clock is fast. In this situation, at time *t1'''*, the shift pulse that appears would arise during the early portion of the time *t1* of the first 0 bit, and this bit of information would be passed into the shift register. In time *t2'''*, the shift pulse would again appear early in the time period *t2* and the second 1 bit would be admitted to the shift register 31. At time *t3'''*, the 0 bit in the time *t3* would also be accepted by the shift register 31. At time *t4'''*, the 1 bit in time period *t4* would just be caught as it can be seen that the pulse when traced up to the 1 bit during time *t4* appears just after the 0 bit in time *t4* starts. At time *t5'''*, we see the shift pulse, if traced, will also just fall in the time *t4* of the fourth 1 bit. In this situation we see the 0 bit during time *t4* being counted twice. This is an intolerable situation, for the shift register would now believe that it has seen not four consecutive 0's but five. And the problem, it will be appreciated, will reoccur periodically depending upon the degree to which the clock pulses are slow or fast.

Attention is now redirected to FIG. 2*b*. In this figure, in the lower portion thereof, the relationship between the shift pulse delivered by the flip-flop No. 4, designated by reference numeral 58, is shown appearing approximately in the middle of the mark 1. It will be recalled that the binary counter reset gate 33 is being reset each time either a change to mark or a space appears on the electrical leads 26 and 27 of FIG. 2*a*. This means that each time that the code changes from one state to another pursuant to the code format described earlier, there will be a reset pulse delivered to the binary counter 52 which will positively insure the fact that a new zero time, as depicted in FIG. 2*b*, will be established and the system is insured of providing a shift pulse exactly in the middle of the next oncoming bit. Depending now upon the accuracy of the clock, one of the species of the binary counter reset gate 33, set forth in FIGS. 3, 4 and 5, may be employed, and of course the accuracy of the clock may be even less where there is a reset pulse delivered every time there is a change in state as per the arrangement set forth in FIG. 5. If the clocks are relatively accurate and their pulse rate variation is not too great, it may be totally acceptable to use a reset pulse approximately every other bit of the delivered message. It can therefore be seen that, because of the code pattern format set forth earlier, the message whether it be 0's or 1's may continue ad infinitum because the code pattern itself will always reset the counter, and therefore provide the needed synchronization. This allows the use of conventional, inexpensive clocks such as multivibrators, and the effect of change in temperature, which produces change in the rate to which the clock is functioning, will produce no effect whatsoever upon the message and its faithful acceptance by the shift register of the system.

It should also be understood of course that this entire arrangement which has only one field location shown in some detail is equally applicable in the transmission of messages back to the main or central office. For the problem exists equally with reference to the delivery of indications from the remote field locations to the central office. Therefore, it will be appreciated that the clock at the central office and the clock at the field location both may be of rather modest accuracy and conventional type and that the message need never be interrupted for purposes of synchronizing the clocks because the message code format provides inherently the function of resetting the counters without regard to the direction in which the system is operating, either from the central station to a field location, or from a field location to the central station. While the problem has been described with reference to a slow or a fast clock at the field location, it will be readily appreciated that the problem is solved just as well should the central clock be slow or fast with reference to the field clock, this of course being only a matter of what is meant by being slow or fast and whether the measurement of the clock pulse rate is with reference to the central station, or on the other hand with reference to the field location. It can, therefore, be seen that this novel and highly simplified form of providing a reset function and a novel code format provides advantages heretofore never presented by a code transmission system.

While the present invention has been illustrated and disclosed in connection with the details of the illustrative embodiments thereof, it should be understood that those are not intended to be limitative of the invention as set forth in the accompanying claims.

Having thus described our invention, what we claim is:

1. A digital code transmission system which allows the transmission of messages in bit form of unlimited length over a communication link between an office and a remote station, (A) said office having a master clock electrically coupled to a code generator which provides the time base for a predetermined code generated by said code generator at said office, said code generator electrically coupled to said communication link to allow transmission of said message to said remote station, (1) said code is always changing from at least one state to at least one other state with each message bit transmitted, (B) said remote station having code message detecting means electrically coupled to said communication link and electrically coupled to a clock which is controlled by said code message detecting means, said remote station clock in turn drives a digital counter, which counter in turn controls a shift register, which shift register is fed the code detected by said code message detecting means, (C) digital counter reset means electrically coupled to said code message detecting means and controlled by said code detected by said code message detecting means and electrically coupled to said digital counter to reset said digital counter whenever said code changes from said one state to said other state with each message bit detected coupled with said change in state.

2. A binary code transmission system which allows the transmission of messages in bit form of unlimited length over a communication link between an office and a remote station, (A) said office having a master clock electrically coupled to a code generator which provides the time base for a predetermined binary code generated by said code generator at said office, said code generator electrically coupled to said communication link to allow transmission of said message to said remote station, (1) said code always changing from either a mark to a space or a space to a mark with each message bit transmitted, (B) said remote station having code message detecting means electrically coupled to said communication link and electrically coupled to a clock which is controlled by said code message detecting means, which clock drives a binary counter, which binary counter in turn controls a shift register, which shift register is fed said code detected by said code message detecting means, (C) binary counter reset means electrically coupled to said code message detecting means and controlled by said code detected by said code message detecting and means electrically coupled to said digital counter to reset said binary counter whenever said binary code changes from a mark to a space and from a space to a mark with each message bit detected coupled with said change in state, (1) said binary counter having a plurality of stages, each stage electrically coupled to the preceding state and shiftable between a first and second state whenever each of said stages receives a pair of signals, the first stage of said plurality of stages driven by a series of pulses from said clock at said remote location, said reset means effective to simultaneously cause all of said stages to go to said first state.

3. The code transmission system of claim 2 wherein said binary counter reset means is a gate which produces a binary counter reset pulse everytime there is a change to a mark from a space in said code detected by said code message detecting means.

4. The code transmission system of claim 2 wherein said binary counter reset means is a gate which produces a binary counter reset pulse everytime there is a change to a space from a mark in said code detected by said code message detecting means.

5. The code transmission system of claim 2 wherein said binary counter reset means is a gate which produces a binary counter reset pulse everytime there is a change from either a space to a mark or vice versa in said code detected by said code message detecting means.

References Cited

UNITED STATES PATENTS

| | | | |
|---|---|---|---|
| 3,333,205 | 7/1967 | Featherston | 307—269 |
| 3,419,805 | 12/1968 | Melas | 178—68 |
| 3,419,804 | 12/1968 | Gorog et al. | 178—68 |

ROBERT L. GRIFFIN, Primary Examiner

A. H. EDDLEMAN, Assistant Examiner

U.S. Cl. X.R.

178—68

PO-1050
(5/69)

UNITED STATES PATENT OFFICE
CERTIFICATE OF CORRECTION

Patent No. 3,509,277 Dated April 28, 1970

Inventor(s) William H. Moore and Vito J. Alioto

It is certified that error appears in the above-identified patent and that said Letters Patent are hereby corrected as shown below:

Column 10, line 71 "and means" should be --means and--

SIGNED AND SEALED

AUG 25 1970

(SEAL)
Attest:

Edward M. Fletcher, Jr.
Attesting Officer

WILLIAM E. SCHUYLER, JR.
Commissioner of Patents